(12) United States Patent
Watanabe et al.

(10) Patent No.: US 8,942,891 B2
(45) Date of Patent: Jan. 27, 2015

(54) VEHICLE INTERIOR-EXTERIOR STRUCTURE

(75) Inventors: Shinya Watanabe, Seto (JP); Akihiko Ishikawa, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 122 days.

(21) Appl. No.: 13/638,128

(22) PCT Filed: Apr. 1, 2010

(86) PCT No.: PCT/JP2010/056012
§ 371 (c)(1),
(2), (4) Date: Sep. 28, 2012

(87) PCT Pub. No.: WO2011/125147
PCT Pub. Date: Oct. 13, 2011

(65) Prior Publication Data
US 2013/0013156 A1    Jan. 10, 2013

(51) Int. Cl.
| | | |
|---|---|---|
| *B60R 22/00* | (2006.01) | |
| *E05F 15/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *B60R 21/0136* | (2006.01) | |
| *B60R 19/48* | (2006.01) | |
| *B60R 21/00* | (2006.01) | |

(52) U.S. Cl.
CPC ..... *B60R 21/0136* (2013.01); *B60R 2021/0004* (2013.01); *B60R 2021/0006* (2013.01); *B60R 19/483* (2013.01)
USPC .............................................. 701/45; 701/46

(58) Field of Classification Search
USPC .............. 701/45, 46, 22, 60, 41, 70; 293/117, 293/120, 121, 132; 180/274; 340/435, 436; 280/735; 296/24.34, 191
See application file for complete search history.

(56) References Cited

U.S. PATENT DOCUMENTS

| | | | |
|---|---|---|---|
| 5,467,080 A | 11/1995 | Stoll et al. | |
| 7,429,916 B2* | 9/2008 | Kiribayashi | 340/436 |
| 7,498,927 B1 | 3/2009 | Kaji et al. | |
| 7,911,331 B2* | 3/2011 | Tanabe | 340/436 |
| 8,128,140 B2* | 3/2012 | Tanabe | 293/117 |
| 8,653,958 B2* | 2/2014 | Tanabe et al. | 340/436 |
| 2006/0087417 A1* | 4/2006 | Kiribayashi | 340/435 |
| 2006/0191731 A1* | 8/2006 | Hashimoto et al. | 180/274 |

(Continued)

FOREIGN PATENT DOCUMENTS

| | | |
|---|---|---|
| DE | 102008017246 A1 | 10/2009 |
| JP | 59-146247 U | 9/1984 |

(Continued)

*Primary Examiner* — Richard Camby
*Assistant Examiner* — Robert Payne
(74) *Attorney, Agent, or Firm* — Gifford, Krass, Sprinkle, Anderson & Citkowski, P.C.

(57) ABSTRACT

A vehicle interior-exterior structure of the present invention is equipped with a main body formed from a resin foam material, a covering formed from a resilient material to cover the main body, and a void formed between the main body and the covering. The vehicle interior-exterior structure is also equipped with a front bumper cover supported by a vehicle body and a pressure sensor that outputs a signal corresponding to the internal pressure of the void. A reaction force is obtained from the main body when a colliding body collides with the location where the void is positioned in the front bumper and the void undergoes compression deformation. The degrees of freedom for the placement position of the void, namely for the placement position of an impact detection region, can accordingly be raised.

4 Claims, 16 Drawing Sheets

(56) References Cited

U.S. PATENT DOCUMENTS

| | | | |
|---|---|---|---|
| 2008/0258887 A1* | 10/2008 | Gelberi et al. | 340/436 |
| 2009/0021030 A1* | 1/2009 | Tanabe | 293/117 |
| 2009/0254238 A1 | 10/2009 | Metzler | |
| 2011/0160966 A1 | 6/2011 | Witte | |

FOREIGN PATENT DOCUMENTS

| | | |
|---|---|---|
| JP | 11-310095 A | 11/1999 |
| JP | 2001-163130 A | 6/2001 |
| JP | 2001-236869 A | 8/2001 |
| JP | 2006-117157 A | 5/2006 |
| JP | 2006-232126 A | 9/2006 |
| JP | 2007-261307 A | 10/2007 |
| JP | 2008-525255 A | 7/2008 |
| JP | 2009-023410 A | 2/2009 |
| JP | 2009-220785 A | 10/2009 |
| JP | 2009-220787 A | 10/2009 |
| WO | 2010000815 A1 | 1/2010 |

* cited by examiner

VEHICLE INTERIOR-EXTERIOR STRUCTURE

TECHNICAL FIELD

The present invention relates to a vehicle interior-exterior structure.

BACKGROUND ART

A collision detection device is disclosed in Patent Document 1 that includes a chamber member disposed at the inside of a front bumper cover, a pressure sensor that detects the internal pressure of the chamber member, and bumper reinforcement that supports the chamber member.

RELATED ART DOCUMENTS

Patent Document 1: Japanese Patent Application Laid-Open (JP-A) No. 2009-23410
Patent Document 2: JP-A No. 2007-261307
Patent Document 3: JP-A No. 2009-220787
Patent Document 4: JP-A No. 2009-220785
Patent Document 5: JP-A No. 2006-232126

SUMMARY OF INVENTION

Technical Problem

However in the collision detection device disclosed in Patent Document 1, the chamber member needs to be supported from the rear by the bumper reinforcement in order to make the chamber member deform during a collision between the vehicle and a colliding body. There is hence an issue of the low degrees of freedom for the placement position of the chamber member, namely the placement position of the collision detection region.

There is a similar issue when detecting contact between a vehicle and a contacting body.

In consideration of the above issues, an object of the present invention is to provide a vehicle interior-exterior structure capable of raising the degrees of freedom for the placement position of a contact or impact detection region.

Solution to Problem

In order to solve the above issues, a vehicle interior-exterior structure of the present invention includes: a vehicle interior-exterior member including a main body portion formed from a resin and supported by a vehicle body, and a covering formed from a resilient material, the covering closely adhered to the main body portion and covering the main body portion, with a void portion formed between the main body portion and the covering; and a pressure sensor that outputs a signal corresponding to the internal pressure of the void portion.

In such a vehicle interior-exterior structure, the internal pressure of the void portion rises when a detected body makes contact with or collides with the covering material of the vehicle interior-exterior member from the outside and the void portion undergoes compression deformation. A signal corresponding to the internal pressure of the void portion is then output from the pressure sensor.

Hence, according to the vehicle interior-exterior structure, a detected body can be detected as having contacted or collided from outside the covering member of the vehicle interior-exterior member.

The void portion for detecting that a detected body has contacted or collided is formed between the main body portion supported by the vehicle body and the covering. A reaction force is accordingly obtained from the main body portion when the detected body has contacted or collided with the location of the vehicle interior-exterior member where the void portion is positioned, even without disposing a force bearing member such as a vehicle framework member or a vehicle reinforcement member at the rear of the void portion, thereby enabling the void portion to be made to undergo compression deformation. The degrees of freedom can accordingly be raised for the placement position of the void portion, namely for the placement position of the contact or impact detection region.

The vehicle interior-exterior structure of the present invention is preferably configured with the main body portion formed from a foam material.

By adopting such a configuration, since the position of the void portion can be freely set, the degrees of freedom can be raised for the placement position of the contact or impact detection region.

The vehicle interior-exterior structure of the present invention is preferably configured with the void portion formed in an elongated shape.

By adopting such a configuration, the contact or impact detection region can be extended.

The vehicle interior-exterior structure of the present invention is preferably configured with the vehicle interior-exterior member formed in an elongated shape, and the void portion formed across the length direction of the vehicle interior-exterior member.

By adopting such a configuration, the contact or impact detection region can be set across the length direction of the vehicle interior-exterior member.

The vehicle interior-exterior structure of the present invention is preferably configured with a connection portion connecting together the void portion and the pressure sensor configured by a constriction portion.

By adopting such a configuration, the precision of pressure detection by the pressure sensor can be raised due to the pressure being raised by the constriction portion.

The vehicle interior-exterior structure of the present invention is preferably configured with plural void portions formed in communication with each other, and the pressure sensor connected to one of the plural void portions.

By adopting such a configuration the internal pressure of the plural void portions can be detected with the common pressure sensor, whichever one of the plural void portions undergoes compression deformation. The need to provide plural pressure sensors is thereby eliminated, and so the contact or impact detection region can be extended while suppressing an increase in cost.

The vehicle interior-exterior structure of the present invention is preferably configured with the vehicle interior-exterior member configuring a vehicle exterior section, and the vehicle interior-exterior structure further including a controller that actuates at least one of an occupant protection device or a pedestrian protection device installed in the vehicle when the controller has determined that an impact to the vehicle has occurred based on a signal output from the pressure sensor.

By adopting such a configuration, at least one of the occupant protection device or the pedestrian protection device installed in the vehicle can be actuated when the vehicle has been involved in a collision.

The vehicle interior-exterior structure of the present invention is preferably configured with the void portion formed at an outermost portion of the vehicle interior-exterior member.

By adopting such a configuration, a collision of a colliding body with the vehicle interior-exterior member can be detected with good precision.

The vehicle interior-exterior structure of the present invention is preferably configured with: the vehicle interior-exterior member configuring an opening and closing body; an operation portion formed to the vehicle interior-exterior member at the outside of the void portion; and the vehicle interior-exterior structure further including a controller that actuates at least one of a lock release device for releasing a locked state between the opening and closing body and the vehicle body or an opening and closing device for opening or closing the opening and closing body when the controller has determined that the operation portion has been press-operated based on a signal output from the pressure sensor.

By adopting such a configuration, at least one of the lock release device or the opening and closing device can be actuated when the operation portion has been press-operated.

The vehicle interior-exterior structure of the present invention is preferably configured with the void portion formed at a position separated from an outermost portion of the opening and closing body.

By adopting such a configuration, the at least one of the lock release device or the opening and closing device can be suppressed from being actuated even when a contacting body has unintentionally contacted the outermost portion of the opening and closing body.

The vehicle interior-exterior structure of the present invention is preferably configured with: a plurality of the void portions formed in communication with each other; the pressure sensor connected to a first of the plurality of void portions; the vehicle interior-exterior member configuring a side door, and with an operation portion formed in the vehicle interior-exterior member at the vehicle outside of the first of the plurality of void portions or another of the plurality of void portions; and the vehicle interior-exterior structure further including a controller that actuates a side impact occupant protection device installed to the vehicle when the controller has determined that a side impact to the vehicle has occurred in a condition in which a pressure value expressed by a signal output from the pressure sensor exceeds a predetermined first threshold value, and actuates at least one of a lock release device for releasing a locked state between the side door and the vehicle body or an opening and closing device for opening or closing the side door when the controller has determined that the operation portion has been press-operated in a condition in which a pressure value expressed by the signal output from the pressure sensor is less than the first threshold value but exceeds a predetermined second threshold value smaller than the first threshold value.

By adopting such a configuration a side impact occupant protection device installed to the vehicle can be actuated when a side impact to the vehicle has occurred. The at least one of the lock release device or the opening and closing device can also be actuated when the operation portion has been press-operated.

Moreover a common pressure sensor can be employed for both actuating the occupant protection device and for actuating the at least one of the lock release device or the opening and closing device, enabling an increase in cost to be suppressed.

The vehicle interior-exterior structure of the present invention is preferably configured with: the void portion including a first void portion and a second void portion formed so as to be independent of each other; the pressure sensor including a first pressure sensor that outputs a signal corresponding to the internal pressure of the first void portion and a second pressure sensor that outputs a signal corresponding to the internal pressure of the second void portion; the vehicle interior-exterior member configuring a side door with an operation portion formed at the vehicle outside of the second void portion; and the vehicle interior-exterior structure further including a controller that actuates a side impact occupant protection device installed to the vehicle when the controller has determined that a side impact to the vehicle has occurred based on the signal output from the first pressure sensor, and actuates at least one of a lock release device for releasing a locked state between the side door and the vehicle body or an opening and closing device for opening or closing the side door when the controller has determined that the operation portion has been press-operated based on the signal output from the second pressure sensor.

By adopting such a configuration, a side impact occupant protection device installed to the vehicle can be actuated when a side impact to the vehicle has occurred. The at least one of the lock release device or the opening and closing device can also be actuated when the operation portion has been press-operated.

Advantageous Effects of Invention

As explained in detail above, according to the present invention the degrees of freedom can be raised for the placement position for a contact or impact detection region.

DESCRIPTION OF EMBODIMENTS

First Exemplary Embodiment

First explanation follows regarding a first exemplary embodiment of the present invention.

In each of the drawings the arrow UP, the arrow FR and the arrow OUT respectively indicate the vehicle top-bottom direction top side, the vehicle front-rear direction front side, and the vehicle width direction outside (left hand side).

Figure 1:
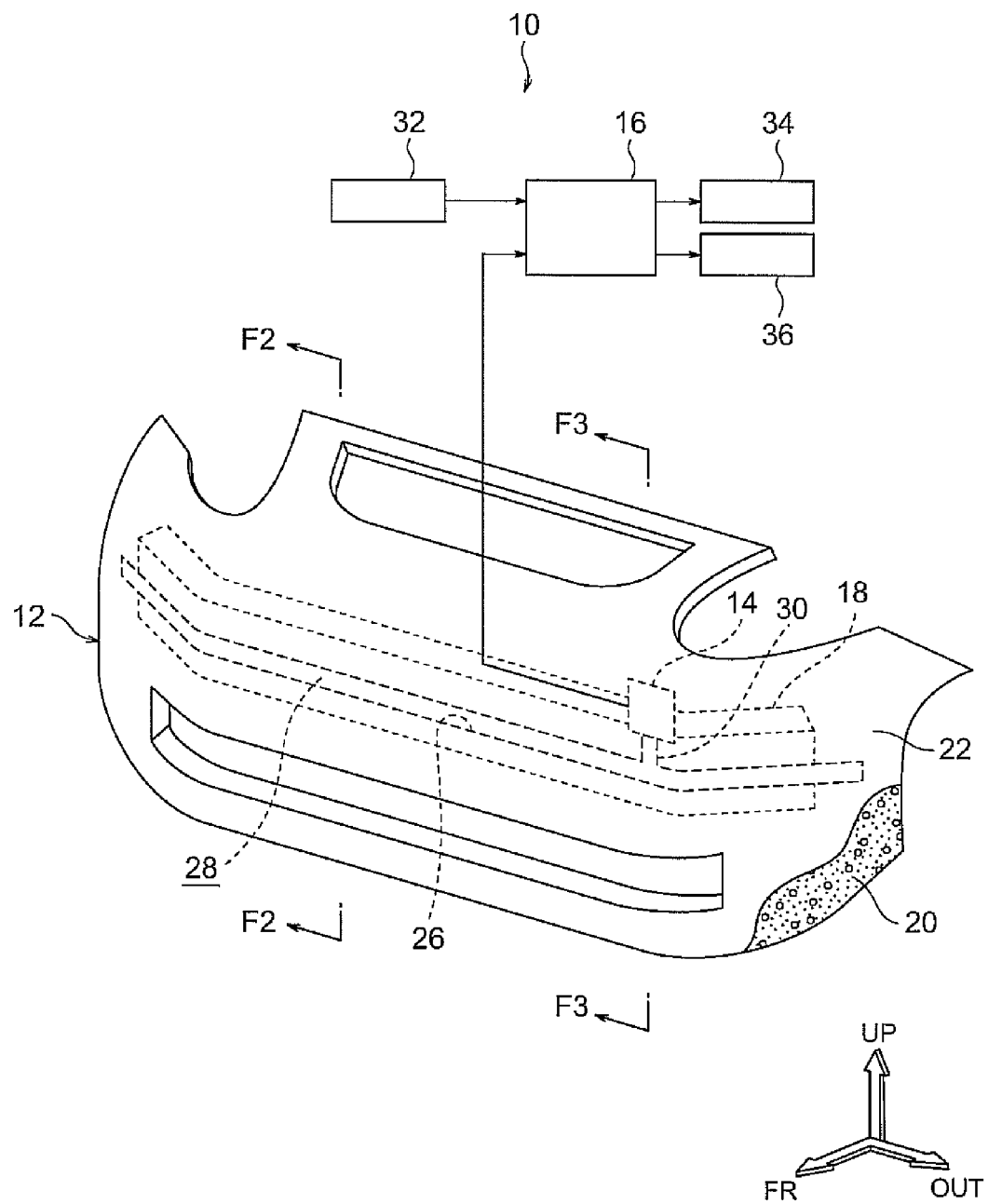
FIG. 1 is a perspective view illustrating a configuration of a vehicle interior-exterior structure according to a first exemplary embodiment of the present invention.

As shown in FIG. 1, a vehicle interior-exterior structure 10 according to the first exemplary embodiment of the present invention is equipped with a front bumper cover 12 serving as a vehicle interior-exterior member, a pressure sensor 14 and a control unit 16 serving as a controller.

The front bumper cover 12 is configured in an elongated shape along the vehicle width direction, covering a bumper reinforcement 18 from the vehicle front side. The front bumper cover 12 is configured with a main body portion 20 and a covering 22.

The main body portion 20 is formed from a resin foam material such as urethane, and is supported from the vehicle body such as by the bumper reinforcement 18 or other vehicle body framework members, not shown in the drawings.

Figure 2:
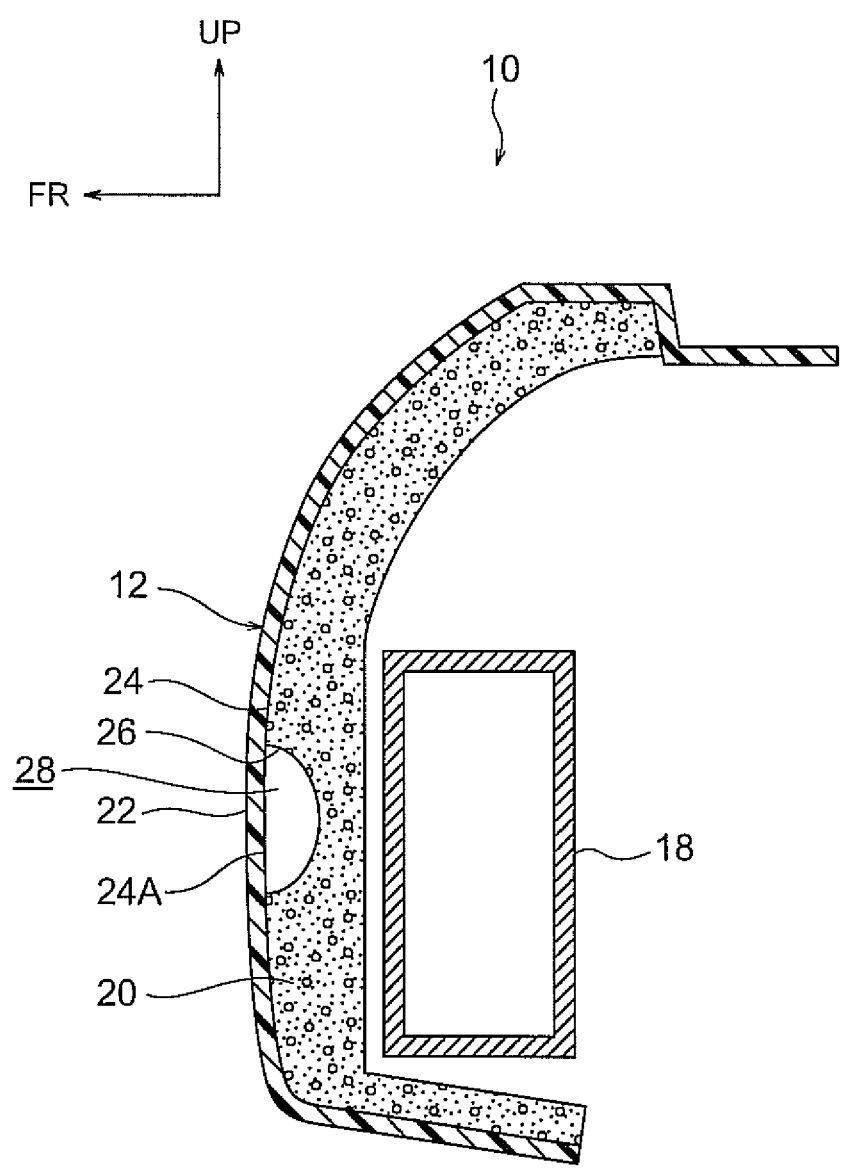
FIG. 2 is a cross-section taken on line F2-F2 of FIG. 1.

As shown in FIG. 2, a front end portion 24 of the main body portion 20 is formed with a convex curved face profile configuring a convex shape on the vehicle front side, and an indentation portion 26 open to the vehicle outside (the vehicle front side) is formed at an apex portion 24A serving as the outermost portion of the front end portion 24. The indentation portion 26 is formed in an elongated shape running along the length direction of the front bumper cover 12 across the length direction of the front bumper cover 12.

The covering 22 is, for example, formed by a resilient material such as a painted resin film, and the covering 22 covers the main body portion 20 from the vehicle front side so as to close off the opening of the indentation portion 26.

The covering 22 is placed in close contact with the main body portion 20 with no gaps therebetween by, for example, welding. A tightly sealed void portion 28 is formed between the main body portion 20 and the covering 22 due to the covering 22 closing off the opening of the indentation portion 26.

Figure 3:
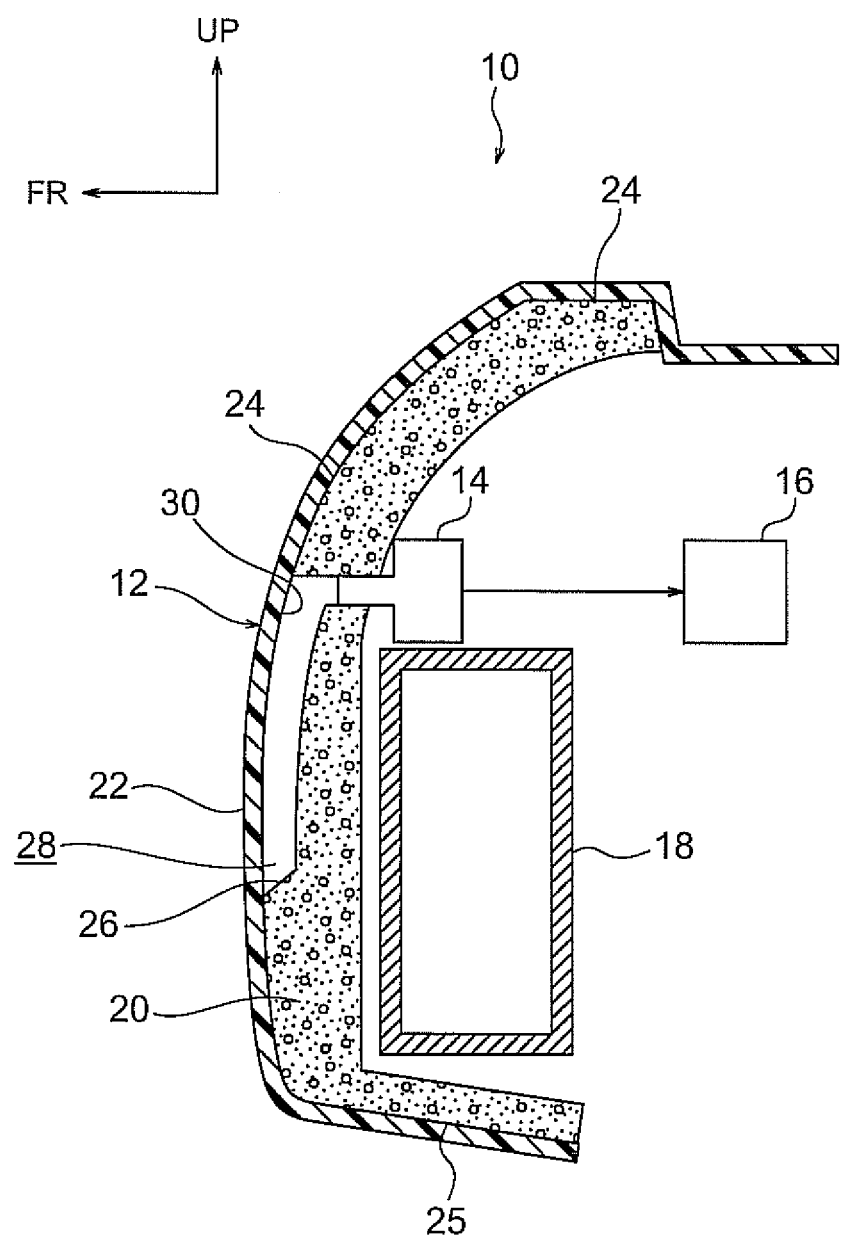
FIG. 3 is a cross-section taken on line F3-F3 of FIG. 1.

The pressure sensor 14 illustrated in FIG. 1 and FIG. 3 is connected to the void portion 28 through a constriction portion 30, in a configuration that outputs a signal to the control unit 16 according to the internal pressure of the void portion 28.

The void portion 28 is formed with a substantially uniform cross-section, and the constriction portion 30 is formed with a smaller cross-section than that of the void portion 28.

The control unit 16 is configured, as described below, to actuate a front impact occupant protection device 34 and a pedestrian protection device 36 installed in a vehicle shown in FIG. 1, according to a signal output from the pressure sensor 14 and signal(s) such as a signal output from a vehicle speed sensor 32.

Explanation follows regarding operation of the vehicle interior-exterior structure 10 described above.

Figure 4:
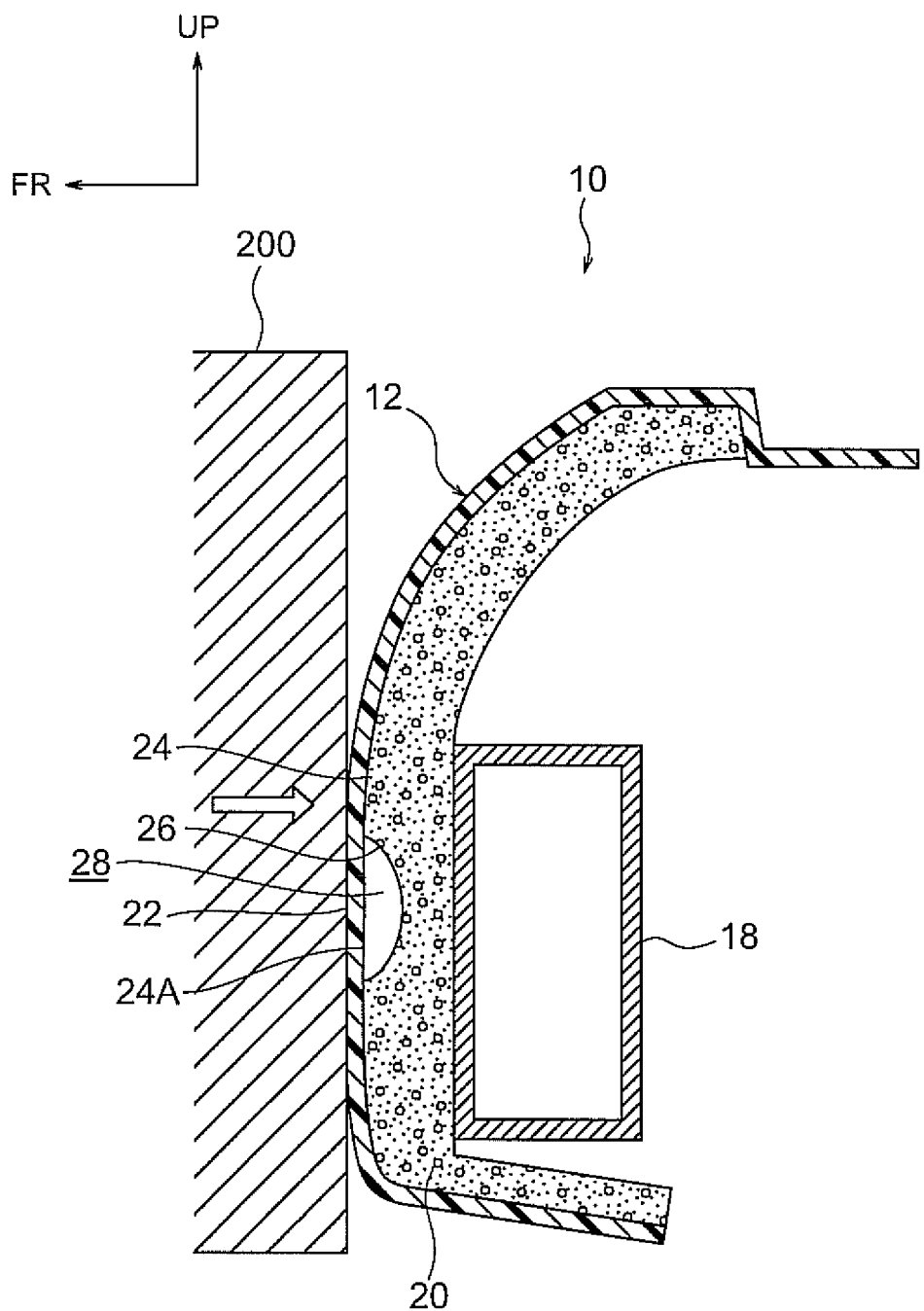
FIG. 4 is the cross-section of FIG. 2 as viewed from the side and illustrating a state in which a colliding body has collided with a front bumper cover illustrated in FIG. 1.
Figure 5:
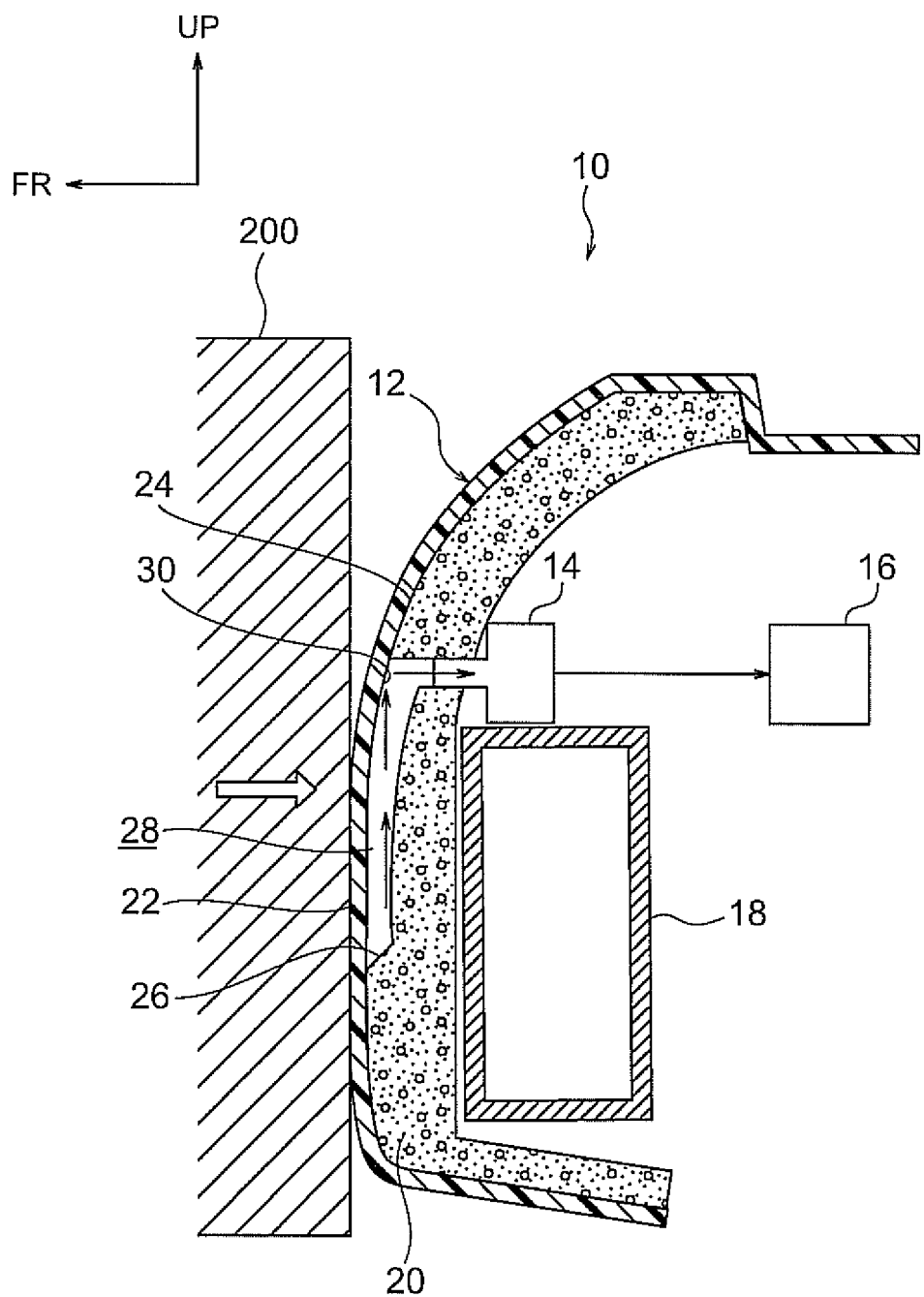
FIG. 5 is the cross-section of FIG. 3 as viewed from the side and illustrating a state in which a colliding body has collided with a front bumper cover illustrated in FIG. 1

In the vehicle interior-exterior structure 10, as shown in FIG. 4 and FIG. 5, the internal pressure of the void portion 28 rises when a colliding body 200 collides with the front bumper cover 12 from the vehicle front side and the void portion 28 undergoes compression deformation. A signal corresponding to the internal pressure of the void portion 28 is output from the pressure sensor 14 illustrated in FIG. 1 to the control unit 16.

The control unit 16 determines whether or not a front impact to the vehicle has occurred based on the signal output from the pressure sensor 14 and for example the signal output from the vehicle speed sensor 32.

Namely, the control unit 16 determines that a front impact to the vehicle has occurred when a pressure value expressed by the signal output from the pressure sensor 14 exceeds a predetermined threshold value and vehicle speed value expressed by the signal output from the vehicle speed sensor 32 exceeds a predetermined threshold value, and determines that the vehicle has not been involved in a front impact in other cases.

When the control unit 16 has determined that a front impact to the vehicle has occurred an actuation signal is output from the control unit 16 to the occupant protection device 34 and the pedestrian protection device 36, and occupant protection device 34 and the pedestrian protection device 36 are actuated in response to the actuation signal.

Note that configuration may be made such that in such cases an actuation signal is output from the control unit 16 to only one device out of the occupant protection device 34 and the pedestrian protection device 36, or configuration may be made such that an actuation signal is output from the control unit 16 to both the occupant protection device 34 and the pedestrian protection device 36.

Explanation follows regarding operation and advantageous effects of the first exemplary embodiment of the present invention.

The vehicle interior-exterior structure 10 enables the fact that a colliding body has collided with the front bumper cover 12 from the vehicle outside to be detected.

The front impact occupant protection device 34 and/or the pedestrian protection device 36 that are installed in the vehicle can also be actuated when a colliding body has collided with the front bumper cover 12 from the vehicle front side.

The void portion 28 for detecting that a colliding body has collided is formed between the covering 22 and the main body portion 20 that is supported from the vehicle body through the bumper reinforcement 18 or for example other vehicle body framework members, not shown in the drawings. Consequently, reaction force from the main body portion 20 is obtained and the void portion 28 can be made to undergo compression deformation when a colliding body collides with the front bumper cover 12, even without disposing a force bearing member such as a vehicle framework member or vehicle reinforcement member at the rear of the void portion 28. The degrees of freedom for the placement position of the void portion 28, namely for the placement position of a front impact detection region, can be raised.

Note that while in the present exemplary embodiment, as an example, the bumper reinforcement 18 is disposed to the rear of the void portion 28, the void portion 28 need not be set in a position such that the bumper reinforcement 18 is disposed to the rear of the void portion 28.

In the vehicle interior-exterior structure 10, the position of the void portion 28 can accordingly be freely set since the main body portion 20 is formed from a foam material. The degrees of freedom for the placement position of the front impact detection region can accordingly be further raised.

The void portion 28 is also formed with an elongated shape, thereby enabling the front impact detection region to be expanded.

The void portion 28 is also formed across the length direction of the front bumper cover 12, thereby enabling the front impact detection region to be set across the length direction of the front bumper cover 12.

The connection portion that connects together the void portion 28 and the pressure sensor 14 is configured by the constriction portion 30, with the pressure increased by the constriction portion 30, thereby enabling the precision of pressure detection by the pressure sensor 14 to be raised.

The void portion 28 is formed at the outermost portion of the front bumper cover 12, namely at the apex portion 24A on the front end portion 24 of the main body portion 20, thereby enabling the fact that a colliding body has collided with the front bumper cover 12 to be detected with better precision.

The void portion 28 is formed to a portion in the vicinity of the covering 22, thereby enabling the collision detection precision to be raised.

The void portion 28 is formed between the main body portion 20 and the covering 22, rendering provision of, for example, a dedicated chamber member for collision detection unnecessary, and thereby enabling a reduction in weight, a reduction in size and a reduction in cost to be achieved.

Second Exemplary Embodiment

Next, explanation follows regarding a second exemplary embodiment of the present invention.

A vehicle interior-exterior structure 40 according to a second exemplary embodiment of the present invention illustrated in FIG. 6 to FIG. 8 has a configuration that has been modified from that of the vehicle interior-exterior structure 10 according to the first exemplary embodiment described above in the following manner.

Namely, the main body portion 20 is formed with an indentation portion 46 positioned at a lower portion of the front bumper cover 12 in addition to the indentation portion 26 positioned at an upper portion of the front bumper cover 12 as described above.

The indentation portion 46 is open towards the vehicle front side, similarly to the indentation portion 26. The indentation portion 46 is formed in an elongated shape running along the length direction of the front bumper cover 12, and is formed across the length direction of the front bumper cover 12. The indentation portion 46 is also formed at an outermost portion (frontmost portion) at the lower portion of the main body portion 20, and the two end sides of the indentation portion 46 curve so as to bend around towards the indentation portion 26 side, and are in communication with the indentation portion 26.

The front bumper cover 12 is formed with a tightly sealed void portion 48 that is in communication with the void portion 28 between the main body portion 20 and the covering 22.

Explanation follows regarding operation of the vehicle interior-exterior structure 40 described above.

Figure 8:
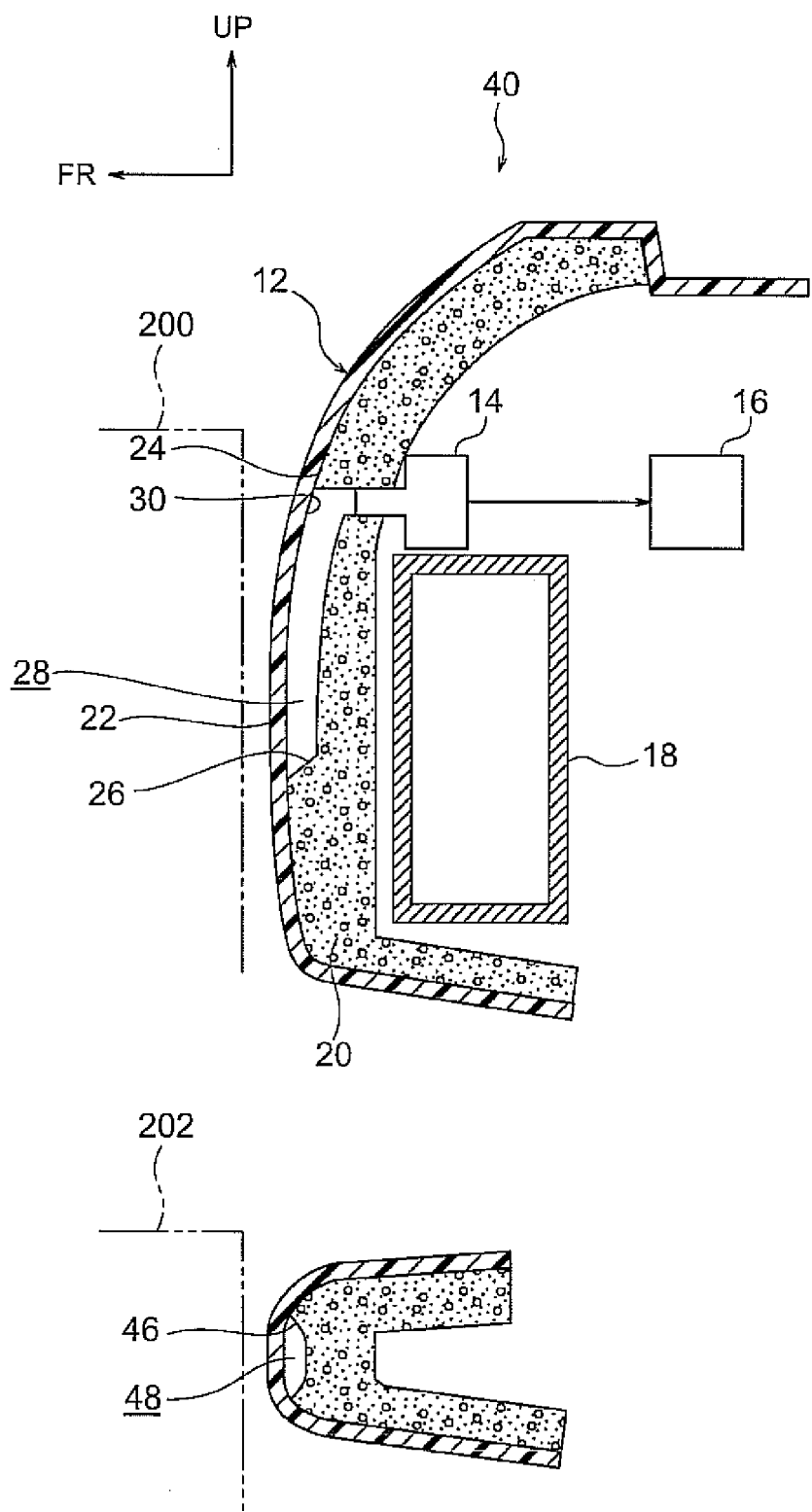
FIG. 8 is a cross-section taken on line F8-F8 of FIG. 6.

In the vehicle interior-exterior structure 40, as shown in FIG. 8, the void portion 28 or the void portion 48 undergo compression deformation due to the colliding body 200 colliding with the upper portion of the front bumper cover 12 or due to a colliding body 202 colliding with the lower portion of the front bumper cover 12, thereby raising the internal pressure of the void portion 28, 48. A signal corresponding to the internal pressure of the void portion 28, 48 is then output from the pressure sensor 14 to the control unit 16.

Figure 6:
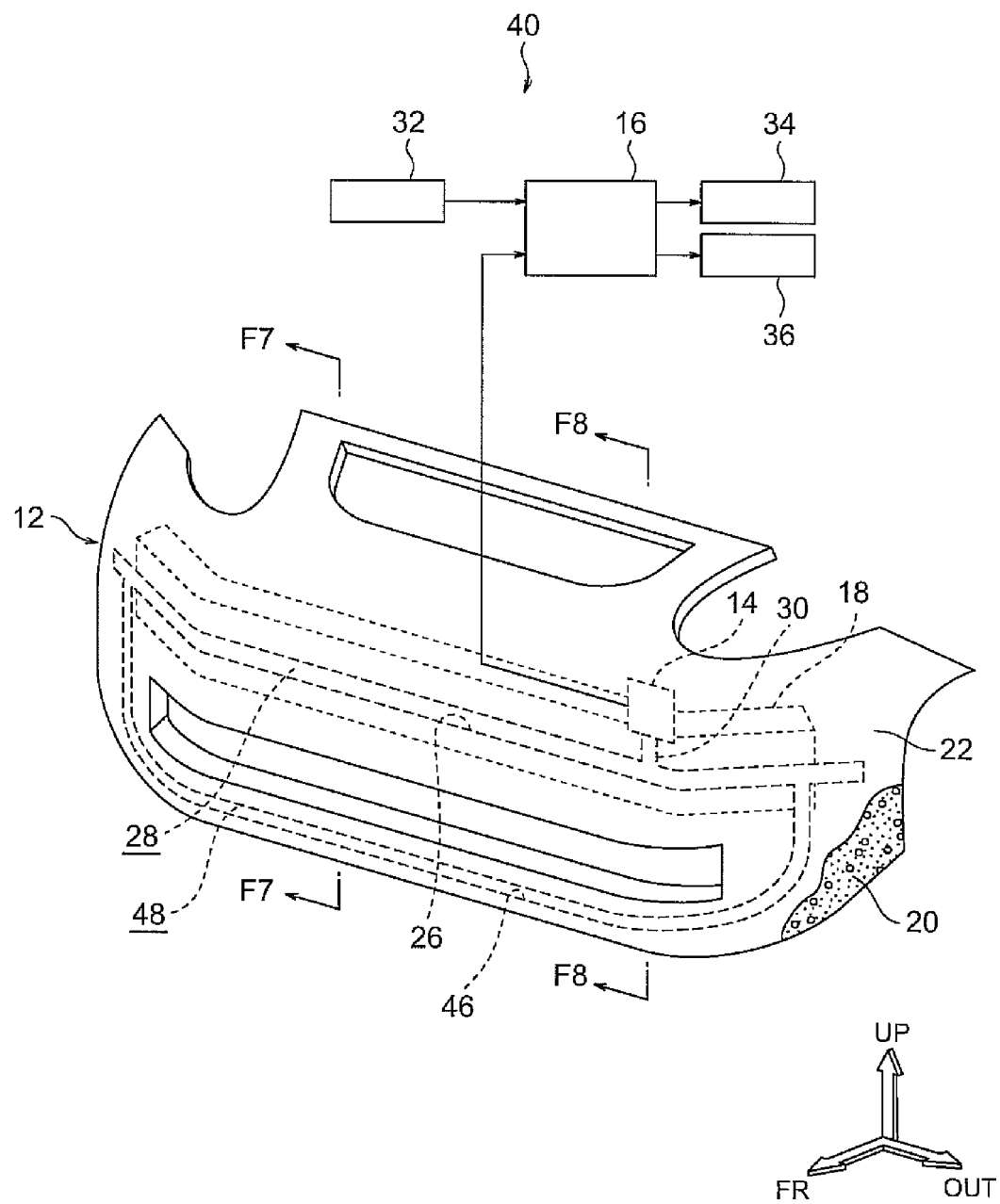
FIG. 6 is a perspective view illustrating a configuration of a vehicle interior-exterior structure according to a second exemplary embodiment of the present invention.
Figure 7:
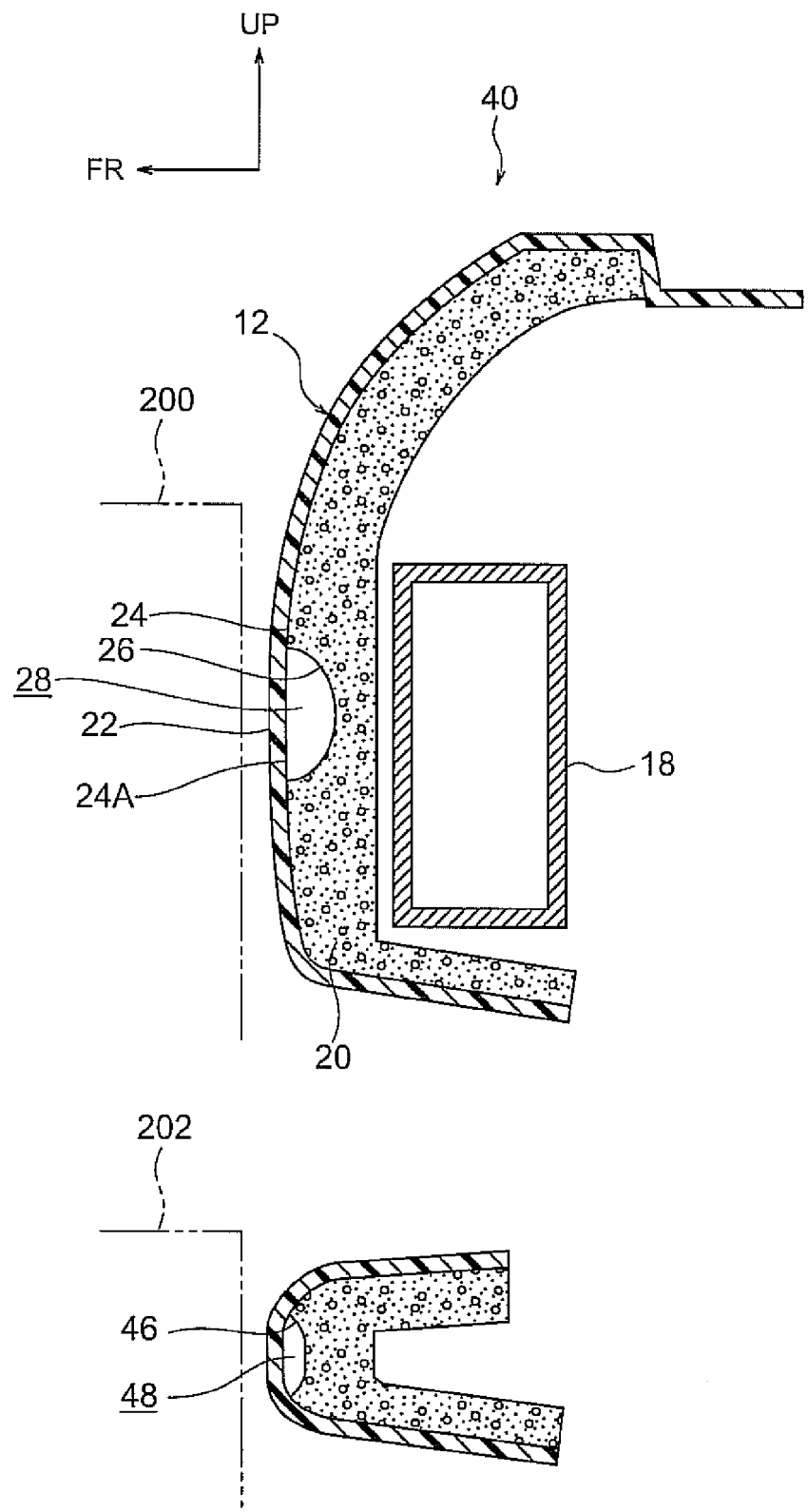
FIG. 7 is a cross-section taken on line F7-F7 of FIG. 6.

In the control unit 16 illustrated in FIG. 6, determination is made as to whether or not a front impact to the vehicle has occurred based on the signal output from the pressure sensor 14 and signal(s) such as a signal output from the vehicle speed sensor 32. The determination method here is similar to that in the first exemplary embodiment described above.

When it has been determined in the control unit 16 that a front impact to the vehicle has occurred, similarly to in the first exemplary embodiment described above, an actuation signal is output from the control unit 16 to the occupant protection device 34 and the pedestrian protection device 36, and the occupant protection device 34 and the pedestrian protection device 36 are actuated in response to the actuation signal.

Explanation follows regarding operation and advantageous effects of the second exemplary embodiment of the present invention that differ from those of the first exemplary embodiment.

According to the vehicle interior-exterior structure 40, the internal pressure of the void portion 28, 48 can be detected by the common pressure sensor 14 when one of the void portions 28, 48 has undergone compression deformation due to either a colliding body colliding with the upper portion of the front bumper cover 12 or a colliding body colliding with the lower portion of the front bumper cover 12. Consequently, since there is no need to provide plural individual pressure sensors 14 the front impact detection region can be expanded while still suppressing costs from rising.

Third Exemplary Embodiment

Explanation follows regarding a third exemplary embodiment of the present invention.

Figure 9:
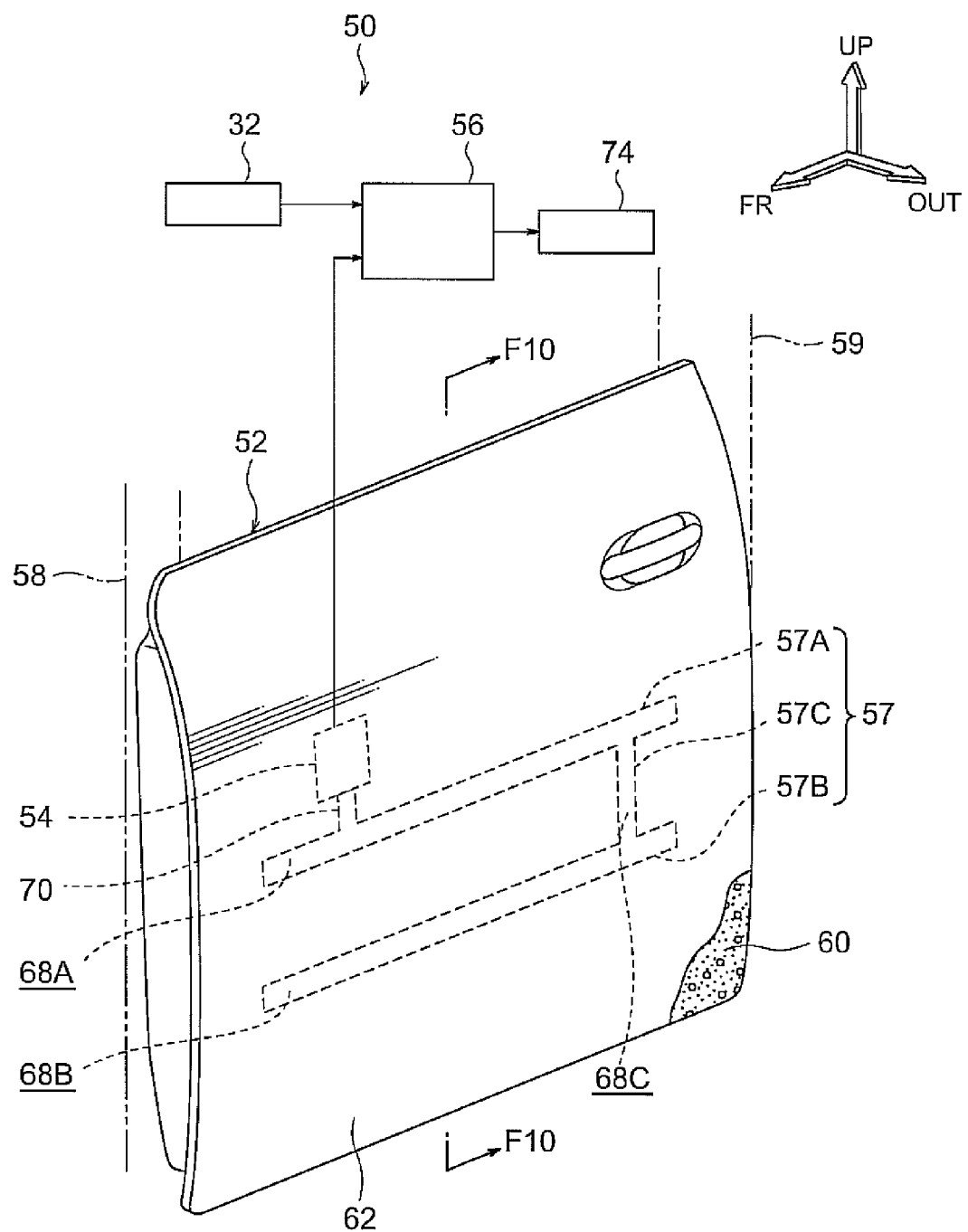
FIG. 9 is a perspective view illustrating a configuration of a vehicle interior-exterior structure according to a third exemplary embodiment of the present invention.
Figure 10:
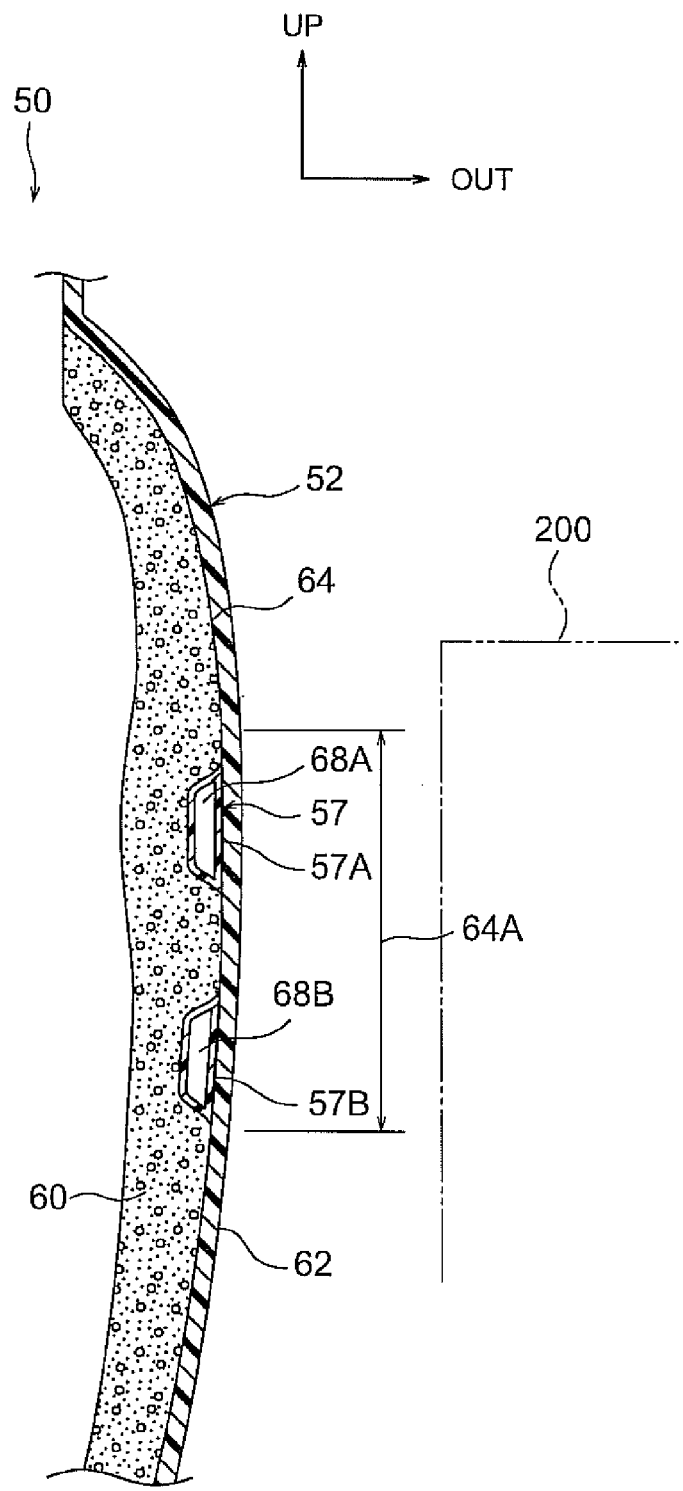
FIG. 10 is a cross-section taken on line F10-F10 of FIG. 9.

As shown in FIG. 9 and FIG. 10, a vehicle interior-exterior structure 50 according to a third exemplary embodiment of the present invention is equipped with a side door 52 serving as a vehicle interior-exterior member, a pressure sensor 54, a control unit 56 serving as a controller, and a hollow member 57.

The side door 52 is provided at a side face portion of the vehicle and is formed in an elongated shape along the vehicle front-rear direction. The side door 52 is configured including a main body portion 60 and a covering 62.

The main body portion 60 is formed from a resin foam material, such as a urethane, and the front end side of the main body portion 60 is rotatably fixed to a front pillar 58. The main body portion 60 is also fixed to a center pillar 59 when the side door 52 is in a closed state. As shown in FIG. 10, an outside portion 64 of the main body portion 60 is formed with a convex curved face profile configuring a convex shape on the vehicle outside.

The covering 62 is, for example, formed by a resilient material such as a painted resin film, and the covering 62 covers the main body portion 60 from the vehicle outside.

The hollow member 57 is formed from a resilient resin material, and is provided in a state buried in the main body portion 60, between the main body portion 60 and the covering 62. The hollow member 57 is disposed at an apex portion 64A serving as the outermost portion of the outside portion 64.

The hollow member 57, as shown in FIG. 9, is configured including a pair of hollow portions 57A, 57B formed in elongated shapes along the vehicle front-rear direction and a connection portion 57C that extends in the vehicle top-bottom direction and connects together the pair of hollow portions 57A, 57B. The pair of hollow portions 57A, 57B are formed across the length direction of the side door 52.

Void portions 68A, 68B are formed inside the pair of hollow portions 57A, 57B, and a communication path 68C is formed inside the connection portion. The void portions 68A, 68B are placed in communication by the communication path 68C.

The pressure sensor 54 is connected to the void portion 68A through a constriction portion 70, and is configured to output a signal corresponding to the internal pressure of the void portions 68A, 68B to the control unit 56.

Note that the void portions 68A, 68B are formed with substantially uniform cross-sections, and the constriction portion 70 is formed with a cross-section that is smaller than that of the void portions 68A, 68B.

The control unit 56 is configured to actuate a side impact occupant protection device 74 installed in the vehicle based on the signal output from the pressure sensor 54, as described above, and for example on a signal output from an vehicle speed sensor 32.

Explanation follows regarding operation of the vehicle interior-exterior structure 50.

In the vehicle interior-exterior structure 50, as shown in FIG. 10, the internal pressures of the void portions 68A, 68B rise when the colliding body 200 collides with the side door 52 from the vehicle outside and the void portions 68A, 68B undergo compression deformation. A signal corresponding to the internal pressure of the void portions 68A, 68B is then output from the pressure sensor 54 illustrated in FIG. 9 to the control unit 56.

In the control unit 56 illustrated in FIG. 9, determination is made as to whether or not the vehicle has been involved in a side impact based on the signal output from the pressure sensor 54 and signal(s) such as a signal output from the vehicle speed sensor 32.

Namely, the control unit 56 determines that the vehicle has been involved in a side impact when a pressure value expressed by the signal output from the pressure sensor 54 exceeds a predetermined threshold value, and when a vehicle speed value expressed by the signal output from the vehicle speed sensor 32 exceeds a predetermined threshold value. The control unit 56 determines that the vehicle has not been involved in a side impact in other cases.

An actuation signal is output from the control unit 56 to the occupant protection device 74 when the control unit 56 has determined that the vehicle has been involved in a side impact, and the occupant protection device 74 is actuated in response.

Explanation follows regarding operation and advantageous effects of the third exemplary embodiment of the present invention.

According to the vehicle interior-exterior structure 50, the fact that a colliding body has collided with the side door 52 from the vehicle outside can be detected.

The side impact occupant protection device 74 installed in the vehicle can also be actuated when a colliding body has collided with the side door 52 from the vehicle outside.

The void portions 68A, 68B for detecting that a colliding body has collided are formed inside the hollow member 57 provided between the main body portion 60 and the covering 62. The void portions 68A, 68B can accordingly be made to undergo compression deformation since reaction force can be obtained from the main body portion 60 when the colliding body collides with the location where the void portions 68A, 68B are positioned in the side door 52, even without disposing a force bearing member such as a vehicle framework member or a vehicle reinforcement member at the rear of the void portions 68A, 68B. The degrees of freedom can accordingly be raised for the placement position of the void portions 68A, 68B, namely for the placement position of a side impact detection region.

The main body portion 60 is formed by a foam material, and so the position of the void portions 68A, 68B can be freely set. The degrees of freedom in the placement position of the side impact detection region can accordingly be raised.

The void portions 68A, 68B are formed in elongated shapes, and so the side impact detection region can be extended.

The void portions 68A, 68B are formed across the length direction of the side door 52 and so the side impact detection region can be set across the length direction of the side door 52.

The connection portion connecting together the void portion 68A and the pressure sensor 54 is configured by the constriction portion 70, and so pressure can be raised by the constriction portion 70, thereby enabling the pressure detection precision of the pressure sensor 54 to be enhanced.

The void portions 68A, 68B are formed in the outermost portion of the side door 52, namely in the apex portion 64A of the outside portion 64 of the main body portion 60, and so the fact that a colliding body has collided with the side door 52 can be detected with greater precision.

The void portions 68A, 68B are formed in a portion in the vicinity of the covering 62, thereby enabling the collision detection precision to be raised.

Note that in the third exemplary embodiment the void portions 68A, 68B may be configured from indentation portions formed in the main body portion 60 and the covering 62, similarly to as in the first exemplary embodiment.

Fourth Exemplary Embodiment

Explanation follows regarding a fourth exemplary embodiment of the present invention.

A vehicle interior-exterior structure 80 according to a fourth exemplary embodiment of the present invention, illustrated in FIG. 11 and FIG. 12, has a configuration that differs from the vehicle interior-exterior structure 50 according to the third exemplary embodiment described above in the following manner.

Figure 12:
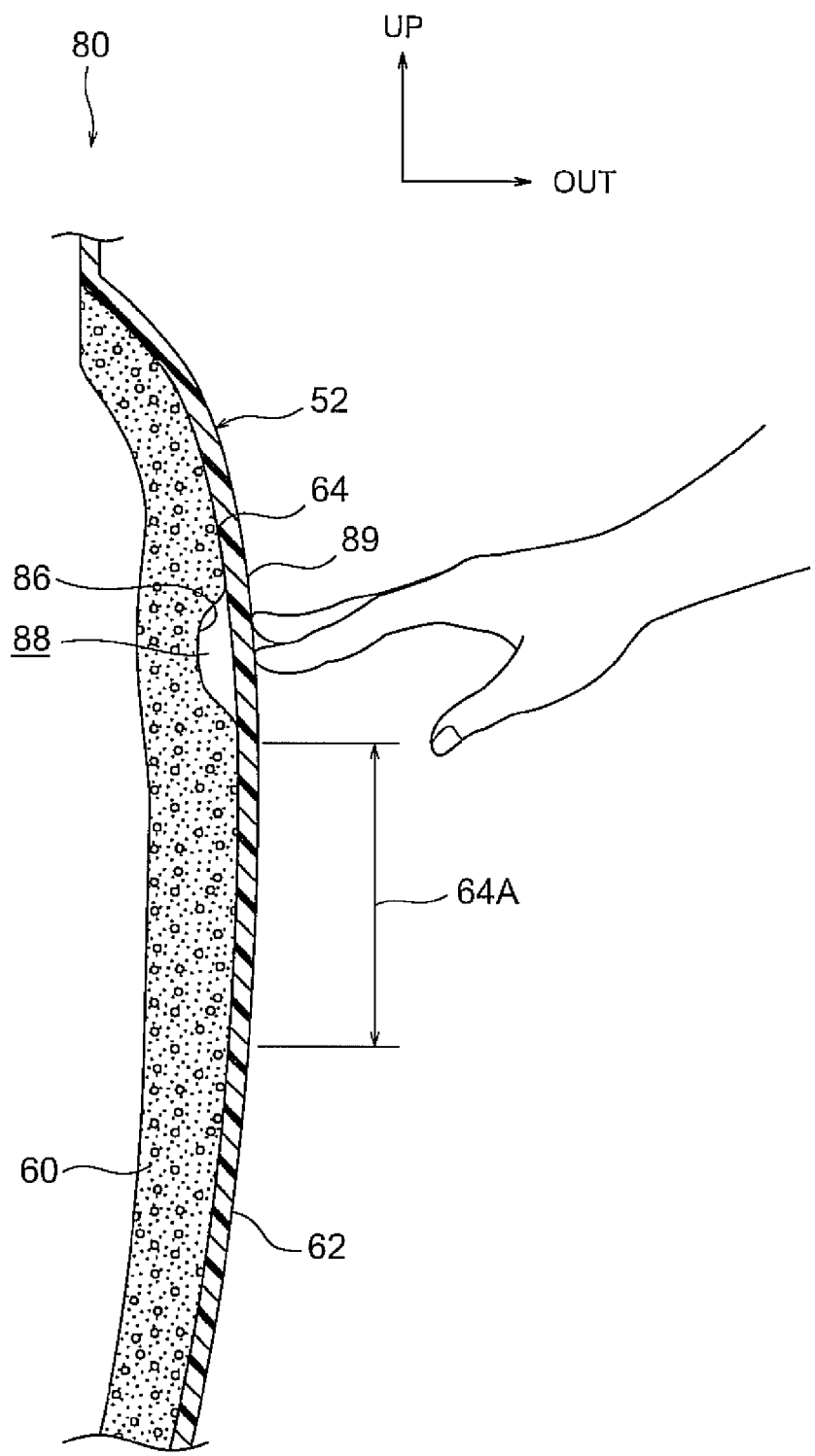
FIG. 12 is a cross-section taken on line F12-F12 of FIG. 11.

Namely, in a main body portion 60, as shown in FIG. 12, an indented portion 86 is formed in an outside portion 64 at a position separated to the top side of an apex portion 64A. The indented portion 86 is open towards the vehicle outside.

A covering 62 is closely attached without any gaps to the main body portion 60, for example by welding. A tightly closed void portion 88 is formed between the main body portion 60 and the covering 62 by the covering 62 covering over the opening of the indented portion 86.

The portion of the covering 62 that closes off the opening of the indented portion 86, namely the portion at the vehicle outside of the void portion 88, is configured as an operation portion 89. The operation portion 89 is, for example, formed of a similar size to a conventional door knob. The outside portion of the side door 52 including the operation portion 89 is configured flat, without any projection portion such as with a conventional door knob.

Figure 11:
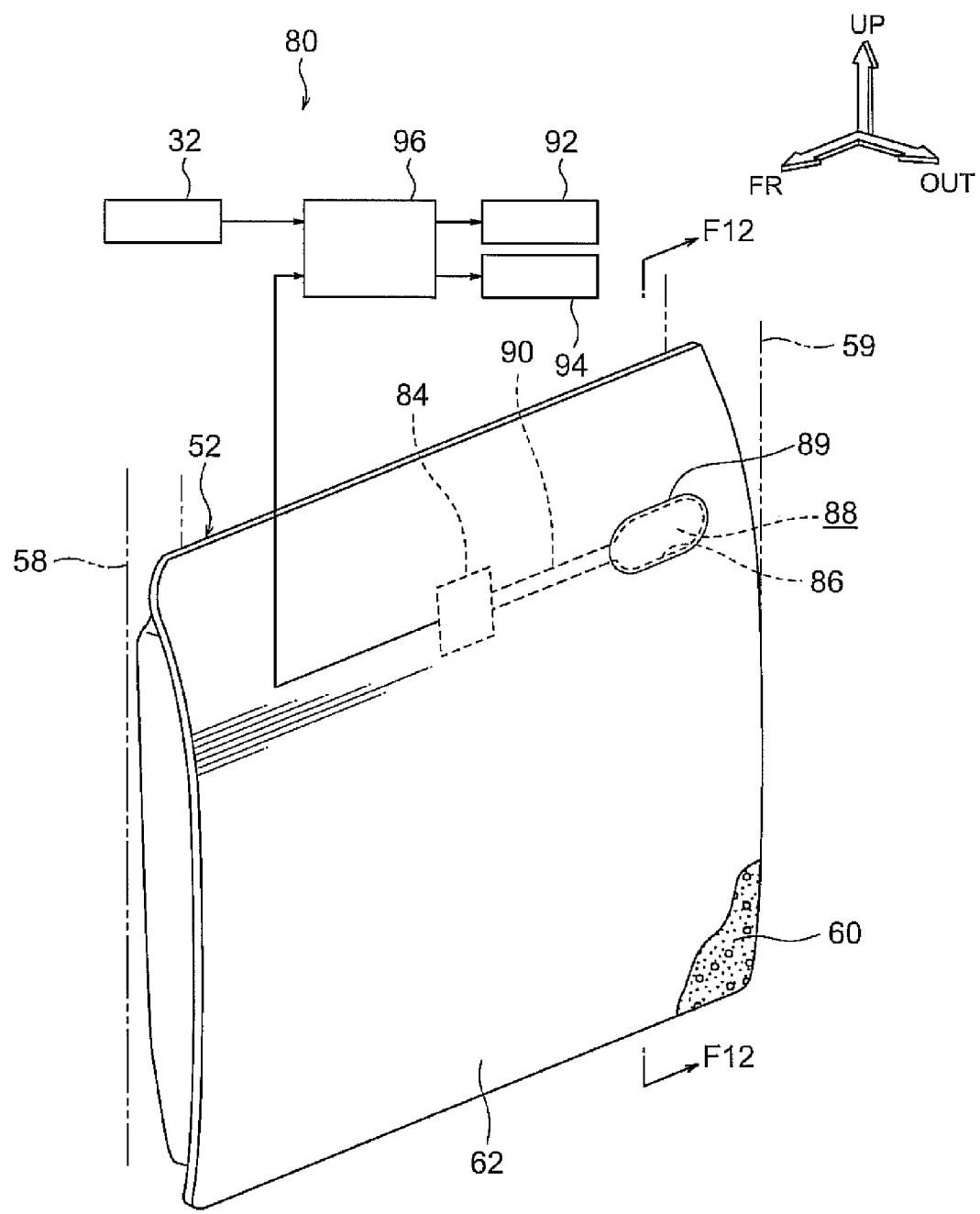
FIG. 11 is a perspective view illustrating a configuration of a vehicle interior-exterior structure according to a fourth exemplary embodiment of the present invention.

As shown in FIG. 11, a pressure sensor 84 is connected through a constriction portion 90 to the void portion 88 described above, and a signal corresponding to the internal pressure of the void portion 88 is output to a control unit 96.

Note that the void portion 88 is formed with a substantially uniform cross-section, and the constriction portion 90 is formed with a smaller cross-section than that of the void portion 88.

As described below, the control unit 96 is configured to, based on the signal output from the pressure sensor 84 and signal(s) such as a signal output from an vehicle speed sensor 32, actuate a lock release device 92 that releases a locked state between the side door 52 serving as an opening and closing body and the vehicle body, and to actuate an opening and closing device 94 that opens or closes the side door 52.

Explanation follows regarding operation of the vehicle interior-exterior structure 80 described above.

In the vehicle interior-exterior structure 80, as shown in FIG. 12, the internal pressure of the void portion 88 rises when the operation portion 89 is press-operated by an operator and the void portion 88 undergoes compression deformation. A signal corresponding to the internal pressure of the void portion 88 is output from the pressure sensor 84 illustrated in FIG. 11 to the control unit 96.

The control unit 96 determines whether or not the operation portion 89 has been press-operated by an operator based on a signal output from the pressure sensor 84 and signal(s) such as a signal output from the vehicle speed sensor 32.

Namely, the control unit 96 determines that the operation portion 89 has been press-operated by an operator when the pressure value expressed by the signal that has been output from the pressure sensor 84 exceeds a predetermined threshold value and when the vehicle speed value expressed by the signal that has been output from the vehicle speed sensor 32 is zero. The control unit 96 determines that the operation portion 89 has not been press-operated by an operator in other cases.

When determined by the control unit 96 that the operation portion 89 has been press-operated by an operator an actuation signal is appropriately output from the control unit 96 to the lock release device 92 and the opening and closing device 94. The lock release device 92 and the opening and closing device 94 are actuated in response thereto.

Namely, more specifically, when the operation portion 89 is pressed by an operator with the side door 52 in a closed state, the lock release device 92 is actuated to render the side door 52 openable, or the lock release device 92 and the opening and closing device 94 are actuated to automatically open the side door 52. However, when the operation portion 89 has been press-operated by an operator with the side door 52 in an open state, the opening and closing device 94 is actuated and the side door 52 is automatically closed.

Note that in such cases, configuration may be made to output an actuation signal from the control unit 96 to only one of the lock release device 92 or the opening and closing device 94 to accompany the press operation of the operation portion 89 by an operator.

Explanation follows regarding points in the operation and advantageous effects of the fourth exemplary embodiment of the present invention that differ from those of the third exemplary embodiment described above.

According to the vehicle interior-exterior structure 80, the fact that the operation portion 89 has been press-operated by an operator can be detected.

The lock release device 92 and/or the opening and closing device 94 can also be actuated when the operation portion 89 has been press-operated.

The void portion 88 is also formed at a position in the outside portion 64 separated to the top side of the apex portion 64A, and so actuation of the lock release device 92 and the opening and closing device 94 can be suppressed if a contacting body unintentionally makes contact with the outermost portion (the location where the apex portion 64A is positioned) of the side door 52.

The void portion 88 is formed between the main body portion 60 and the covering 62, and there is no need to provide for example a dedicated chamber member in order to detect contact, thereby enabling a reduction in weight, a reduction in size and a reduction in cost to be achieved.

The outside portion of the side door 52 including the operation portion 89 is configured flat, without any projection portion such as in a conventional door knob, thereby enabling the aesthetic appearance and wind resistance characteristics of the side door 52 to be enhanced.

The operation portion 89 can also be placed in any desired position on the side door 52, and so the degrees of freedom can be enhanced for placement position of the operation portion 89.

Note that while in the fourth exemplary embodiment the main body portion 60 is formed from a foam material the main body portion 60 may be formed from a hard resin material.

Note that the vehicle interior-exterior structure 80 according to the fourth exemplary embodiment of the present invention may be applied to a vehicle interior member.

Fifth Exemplary Embodiment

Explanation follows regarding a fifth exemplary embodiment of the present invention.

Figure 13:
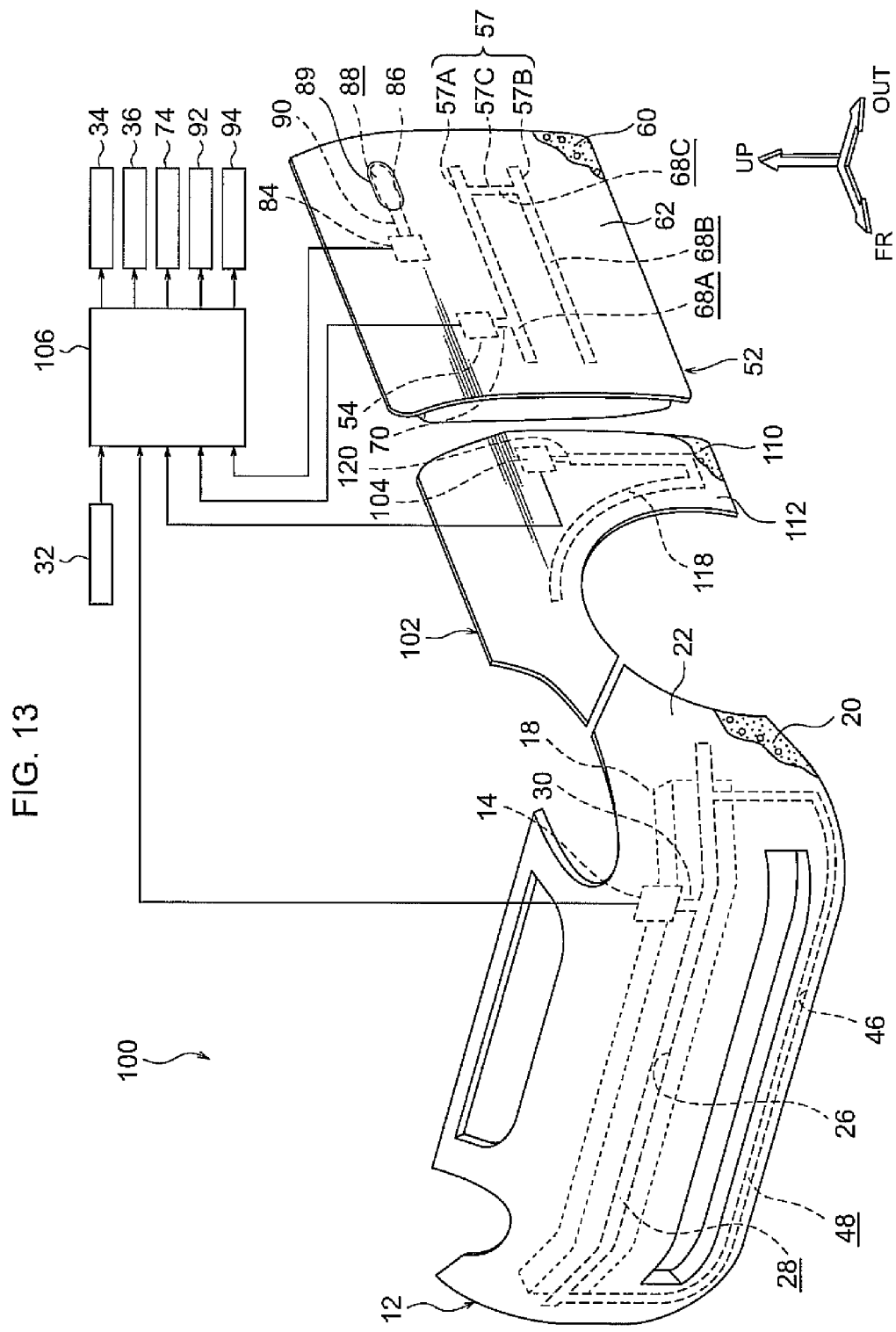
FIG. 13 is a perspective view illustrating a configuration of a vehicle interior-exterior structure according to a fifth exemplary embodiment of the present invention.

A vehicle interior-exterior structure 100 of a fifth exemplary embodiment of the present invention illustrated in FIG. 13 is equipped with a front bumper cover 12, a side door 52, a front fender panel 102 serving as a vehicle exterior section, a pressure sensor 14, a pressure sensor 54 serving as a first pressure sensor, a pressure sensor 84 serving as a second pressure sensor, a pressure sensor 104 and a control unit 106 serving as a controller.

The front bumper cover 12 is configured similarly to that of the second exemplary embodiment described above, and the side door 52 is configured as a combination of the configurations of the third exemplary embodiment and the fourth exemplary embodiment described above. Note that void portions 68A, 68B correspond to a first void portion of the present invention, and a void portion 88 corresponds to a second void portion of the present invention.

The front fender panel 102 includes a main body portion 110 and a covering 112, and is configured similarly to the front bumper cover 12 and the side door 52 described above. Namely, a void portion 118 is formed inside the front fender panel 102.

The pressure sensor 104 is connected to the void portion 118 through a constriction portion 120 and configured to output a signal corresponding to the internal pressure of the void portion 118 to the control unit 106. For the pressure sensors 14, 54, 84, those of the second exemplary embodiment to the fourth exemplary embodiment described above are employed.

The control unit 106 is configured to actuate occupant protection devices 34, 74, a pedestrian protection device 36, a lock release device 92 and an opening and closing device 94 as appropriate based on signals such as signals output from the pressure sensors 14, 54, 84, 104 and a signal output from a vehicle speed sensor 32 similarly to as described above in the second exemplary embodiment to the fourth exemplary embodiment.

The control unit 106 is configured to actuate the occupant protection device 74 when it determines that a side impact to the vehicle has occurred based on signals such as the signal output from the pressure sensor 104 and the signal output from the vehicle speed sensor 32.

According to such a configuration, the occupant protection devices 34, 74 and the pedestrian protection device 36 can be actuated in response when a vehicle has been involved in a front impact and/or a side impact. The lock release device 92 and the opening and closing device 94 and the operation portion 89 can also be actuated as appropriate when the operation portion 89 has been press-operated.

The void portion 118 is also formed in the front fender panel 102, and so the side impact detection region is extended, thereby enabling side impact detection precision to be raised.

Sixth Exemplary Embodiment

Explanation follows regarding a sixth exemplary embodiment of the present invention.

Figure 14:
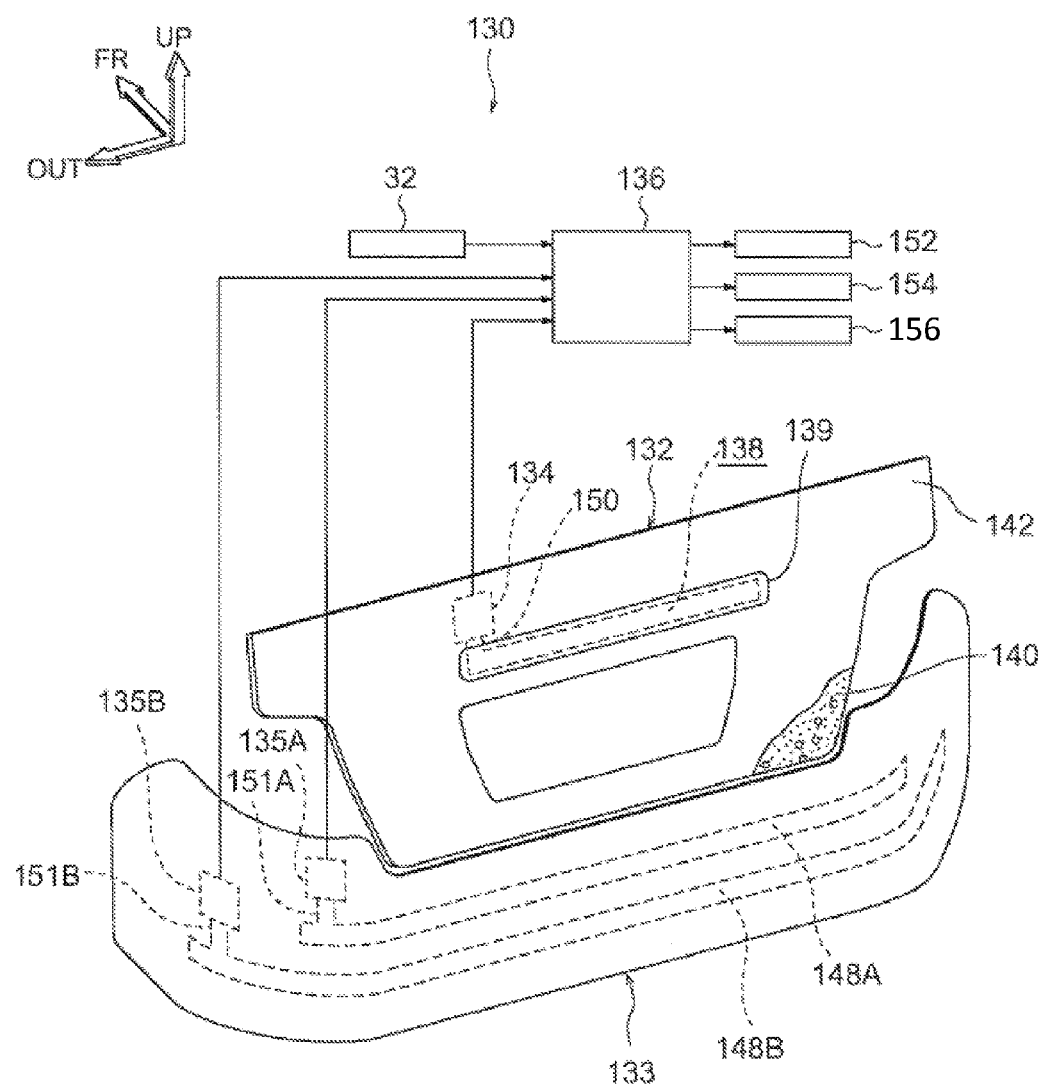
FIG. 14 is a perspective view illustrating a configuration of a vehicle interior-exterior structure according to a sixth exemplary embodiment of the present invention.

A vehicle interior-exterior structure 130 of a sixth exemplary embodiment of the present invention illustrated in FIG. 14 is equipped with a back door 132 serving as a vehicle exterior section and as an opening and closing body, a rear bumper cover 133 serving as a vehicle exterior section, pressure sensors 134, 135A, 135B, and a control unit 136 serving as a controller.

The back door 132 includes a main body portion 140 and a covering 142 and has a structure similar to that of the side door 52 in the fourth exemplary embodiment described above. A void portion 138 is formed inside the back door 132, and the portion at the vehicle outside of the void portion 138 configures an operation section 139. The void portion 138 is formed at a position separated from and above the outermost portion (rearmost portion) of the back door 132.

The rear bumper cover 133 is configured with a structure similar to the front bumper cover 12 described above (see FIG. 13), and void portions 148A, 148B are formed so as to be independent of each other inside the rear bumper cover 133.

A pressure sensor 134 is connected to the void portion 138 described above through a constriction portion 150, and the pressure sensor 134 is configured to output a signal corresponding to the internal pressure of the void portion 138 to the control unit 136.

Pressure sensors 135A, 135B are respectively connected to the void portions 148A, 148B described above through constriction portions 151A, 151B. Each of the pressure sensors 135A, 135B is configured to output a signal to the control unit 136 corresponding to the respective internal pressure of the void portions 148A, 148B.

The control unit 136 is configured, similarly to the fourth exemplary embodiment described above, to actuate a lock release device 152 and an opening and closing device 154 when it has determined that an operator has press-operated an operation section 139 based on a signal output from the pressure sensor 134 and signal(s) such as a signal output from an vehicle speed sensor 32.

The lock release device 152 and the opening and closing device 154 are configured similarly to the lock release device 92 and the opening and closing device 94 of the fourth exemplary embodiment described above.

The control unit 136 is configured to actuate the rear impact occupant protection device 156 when it has determined that a rear impact to the vehicle has occurred based on signals such as the signals output from the pressure sensors 135A, 135B and a signal output from an vehicle speed sensor 32.

According to such a configuration, the occupant protection device 156 can be actuated in response when the vehicle has been involved in a rear impact. The lock release device 152 and the opening and closing device 154 can also be actuated as appropriate when the operation section 139 has been press-operated.

Seventh Exemplary Embodiment

Explanation follows regarding a seventh exemplary embodiment of the present invention.

Figure 15:
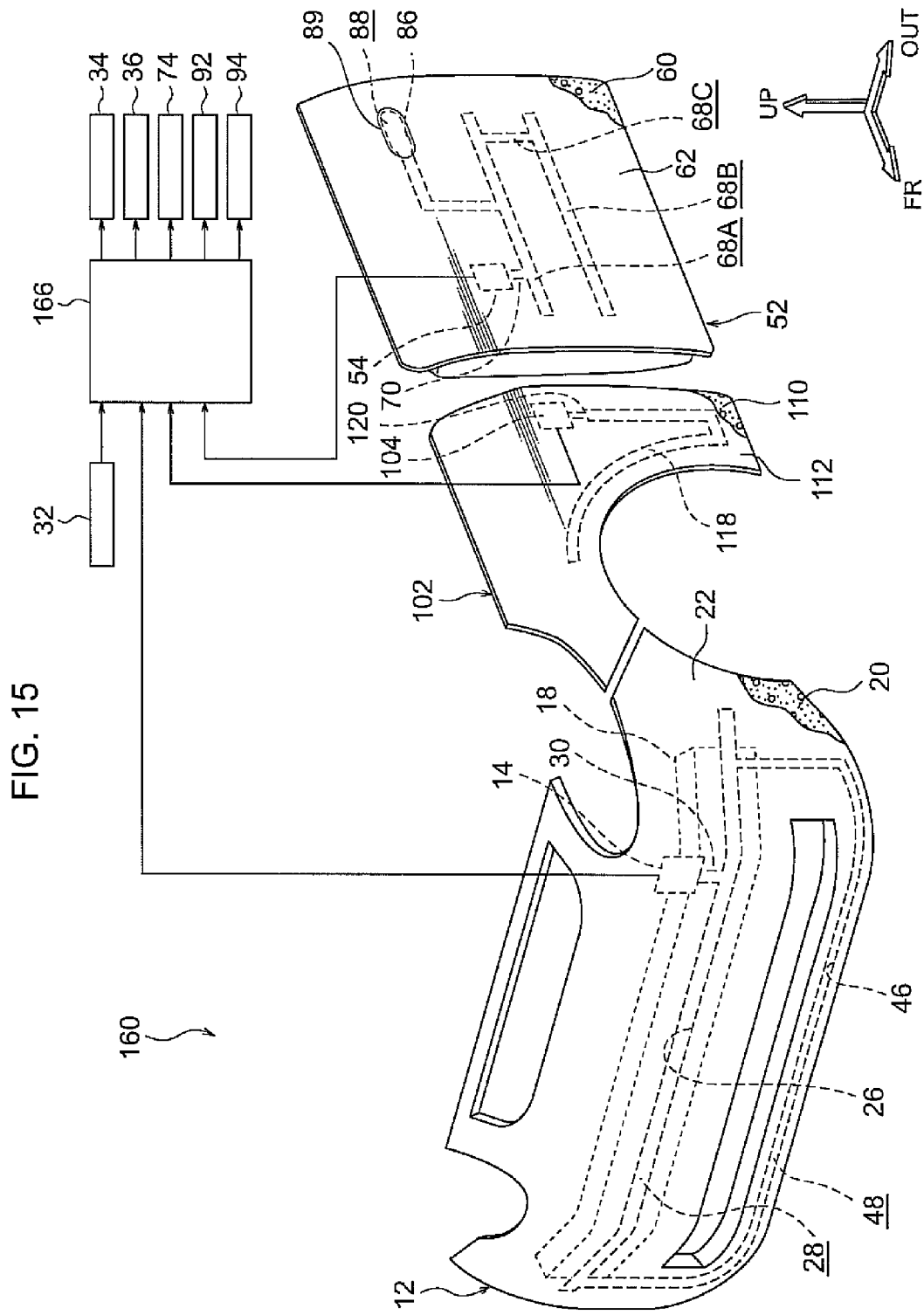
FIG. 15 is a perspective view illustrating a configuration of a vehicle interior-exterior structure according to a seventh exemplary embodiment of the present invention.

As shown in FIG. 15, a vehicle interior-exterior structure 160 according to a seventh exemplary embodiment of the present invention has a configuration modified in the following manner from the vehicle interior-exterior structure 100 of the fifth exemplary embodiment of the present invention described above.

Namely, a void portion 68A and a void portion 88 are in communication with each other. The pressure sensor 84 (see FIG. 13) described above is also omitted from a side door 52.

A control unit 166 is configured as described in the following to actuate occupant protection devices 34, 74, a pedestrian protection device 36, a lock release device 92 and an opening and closing device 94 as appropriate based on signals output from pressure sensors 14, 54, 104 and signal(s) such as a signal output from an vehicle speed sensor 32.

Explanation follows regarding operation of the vehicle interior-exterior structure described above.

In the vehicle interior-exterior structure 160, the internal pressure of void portions 68A, 68B rises when a colliding body collides with the side door 52 from the vehicle outside and the void portions 68A, 68B undergo compression deformation. A signal corresponding to the internal pressure of the void portions 68A, 68B is then output from the pressure sensor 54 to the control unit 166.

Moreover, the internal pressure of a void portion 88 rises when the void portion 88 undergoes compression deformation due to an operator press-operating the operation portion 89. A signal corresponding to the internal pressure of the void portion 88 is then output from the pressure sensor 54 to the control unit 166.

Generally the impact load of a colliding body is greater than an operation load of the operator, and therefore the pressure value expressed by the signal output from the pressure sensor 54 during a side impact is greater than the pressure value expressed by the signal output from the pressure sensor 54 when the operation portion 89 is operated by an operator.

In the control unit 166 determination is made as to whether or not a side impact to the vehicle has occurred and determination is made as to whether or not the operation portion 89 has been press-operated by an operator based on the signal output from the pressure sensor 54 and signals such as the signal output from an vehicle speed sensor 32.

Namely, when the pressure value expressed by the signal output from the pressure sensor 54 exceeds a predetermined first threshold value and when a vehicle speed value expressed by the signal output from the vehicle speed sensor 32 exceeds a predetermined threshold value determination is made in the control unit 166 that the vehicle has been involved in a side impact. Determination is that the vehicle has not been involved in a side impact in other cases.

Moreover, when the pressure value expressed by the signal output from the pressure sensor 54 is less than the first threshold value but exceeds a predetermined second threshold value smaller than the first threshold value, and the vehicle speed value expressed by the signal output from the vehicle speed sensor 32 is zero, determination is made in the control unit 166 that the operation portion 89 has been press-operated by an operator. Determination is that the operation portion 89 has not been press-operated by an operator in other cases.

An actuation signal is then output from the control unit 166 to the occupant protection device 74 when determined in the control unit 166 that a side impact to the vehicle has occurred, and the occupant protection device 74 is actuated in response to the signal.

Moreover, actuation signals are output from the control unit 166 to the lock release device 92 and the opening and closing device 94 as appropriate when determined in the control unit 166 that the operation portion 89 has been press-operated by an operator, and the lock release device 92 and the opening and closing device 94 are actuated in response to the signals.

The operation and advantageous effects of the seventh exemplary embodiment of the present invention differ from those of the above exemplary embodiments in the following respects.

According to the vehicle interior-exterior structure 160, the side impact occupant protection device 74 installed in the vehicle can be actuated in this manner when a side impact to the vehicle has occurred. The lock release device 92 and the opening and closing device 94 can also be actuated as appropriate when the operation portion 89 is press-operated.

The common pressure sensor 54 can also be employed for both actuating the occupant protection device 74 and for actuating the lock release device 92 and the opening and closing device 94, enabling an increase in cost to be suppressed.

Note that in the seventh exemplary embodiment the void portion 88 is in communication with the void portion 68A, and the pressure sensor 54 is connected to the void portion 68A, however configuration may be made with a pressure sensor connected to the void portion 88.

Reference Example

Explanation follows regarding a reference example of the present invention.

Figure 16:
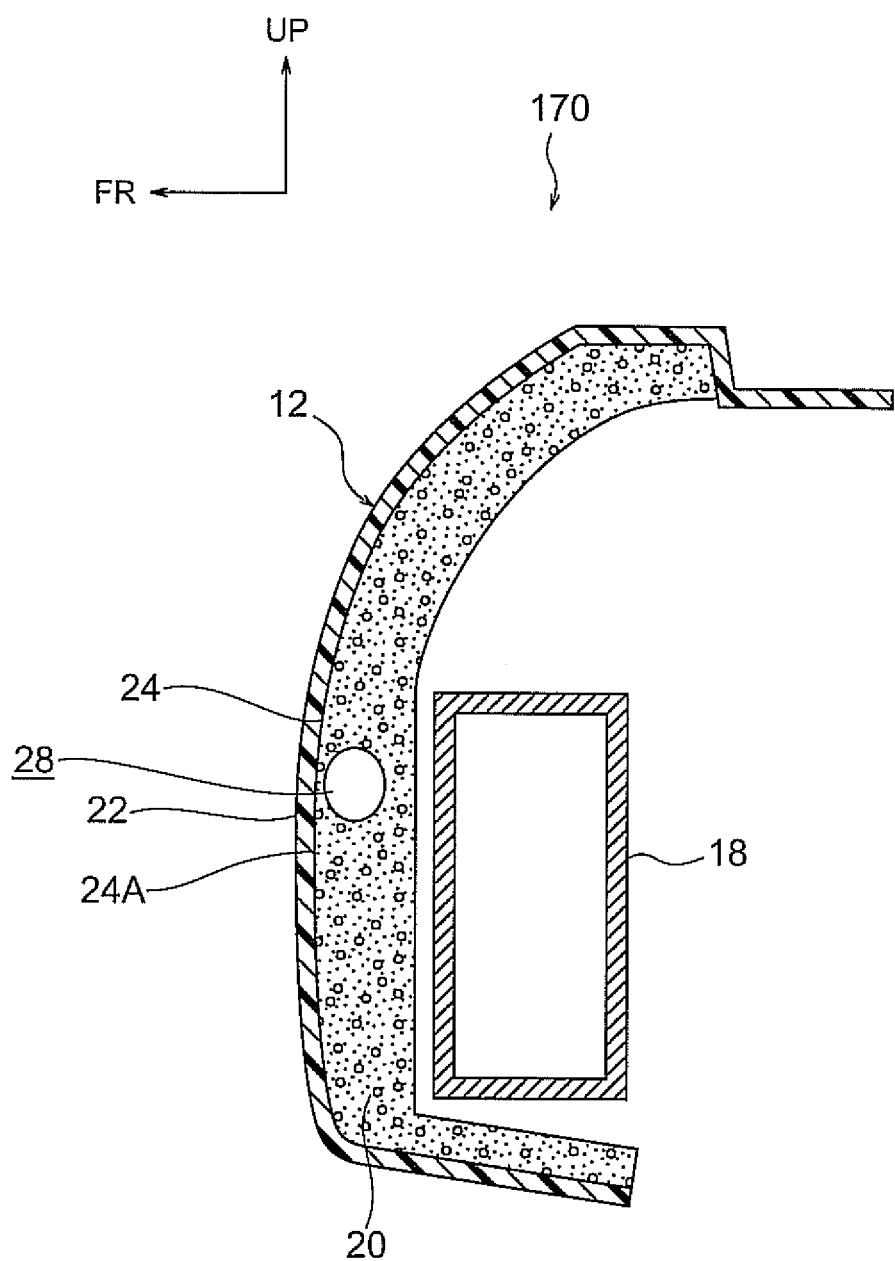
FIG. 16 is a cross-section as viewed from the side corresponding to FIG. 2, illustrating a configuration of a vehicle interior-exterior structure according to a reference example.

A vehicle interior-exterior structure 160 according to a reference example illustrated in FIG. 16 is configured by taking the vehicle interior-exterior structure 10 according to the first exemplary embodiment of the present invention described above and forming a void portion 28 at the vehicle front side inside a main body portion 20.

Adopting such a configuration also enables the fact that a colliding body has collided with the front bumper cover 12 from the vehicle front side to be detected due to the void portion 28 undergoing compression deformation when the colliding body collides with the front bumper cover 12 from the vehicle front side.

The present invention has been explained above by way of exemplary embodiments of the present invention, however the present invention is not limited by the above, and it is obviously possible to implement various other modifications within a scope not departing from the spirit of the present invention.

The invention claimed is:

1. A vehicle interior-exterior structure comprising:
a vehicle interior-exterior member comprising a main body portion formed from a resin and supported by a vehicle body, and a covering formed from a resilient material, the covering closely adhered to the main body portion and covering the main body portion, with a void portion formed between the main body portion and the covering; and
a pressure sensor that outputs a signal corresponding to the internal pressure of the void portion, wherein the vehicle interior-exterior member configures an opening and closing body, and comprises
an operation portion formed to the vehicle interior-exterior member at the outside of the void portion, and
a controller that actuates at least one of a lock release device for releasing a locked state between the opening and closing body and the vehicle body or an opening and closing device for opening or closing the opening and closing body when the controller has determined that the operation portion has been press-operated based on a signal output from the pressure sensor.

2. The vehicle interior-exterior structure of claim 1 wherein the void portion is formed at a position separated from an outermost portion of the opening and closing body.

3. A vehicle interior-exterior structure comprising:
a vehicle interior-exterior member comprising a main body portion formed from a resin and supported by a vehicle body, and a covering formed from a resilient material, the covering closely adhered to the main body portion and covering the main body portion, with a void portion formed between the main body portion and the covering; and
a pressure sensor that outputs a signal corresponding to the internal pressure of the void portion, wherein
a plurality of the void portions are formed in communication with each other,
the pressure sensor is connected to a first of the plurality of void portions,
the vehicle interior-exterior member configures a side door and comprises
an operation portion formed at the vehicle outside of the first of the plurality of void portions or another of the plurality of void portions, and
a controller that
actuates a side impact occupant protection device installed to the vehicle when the controller has determined that a side impact to the vehicle has occurred in a condition in which a pressure value expressed by a signal output from the pressure sensor exceeds a predetermined first threshold value, and
actuates at least one of a lock release device for releasing a locked state between the side door and the vehicle body or an opening and closing device for opening or closing the side door when the controller has determined that the operation portion has been press-operated in a condition in which a pressure value expressed by the signal output from the pressure sensor is less than the first threshold value but exceeds a predetermined second threshold value smaller than the first threshold value.

4. A vehicle interior-exterior structure comprising:
a vehicle interior-exterior member comprising a main body portion formed from a resin and supported by a vehicle body, and a covering formed from a resilient material, the covering closely adhered to the main body portion and covering the main body portion, with a void portion formed between the main body portion and the covering; and
a pressure sensor that outputs a signal corresponding to the internal pressure of the void portion, wherein
the void portion comprises a first void portion and a second void portion formed so as to be independent of each other,
the pressure sensor comprises a first pressure sensor that outputs a signal corresponding to the internal pressure of the first void portion and a second pressure sensor that outputs a signal corresponding to the internal pressure of the second void portion,
the vehicle interior-exterior member configures a side door with an operation portion formed at the vehicle outside of the second void portion and comprises a controller that
actuates a side impact occupant protection device installed to the vehicle when the controller has determined that a side impact to the vehicle has occurred based on the signal output from the first pressure sensor, and actuates at least one of a lock release device for releasing a locked state between the side door and the vehicle body or an opening and closing device for opening or closing the side door when the controller has determined that the operation portion has been press-operated based on the signal output from the second pressure sensor.

* * * * *